UNITED STATES PATENT OFFICE.

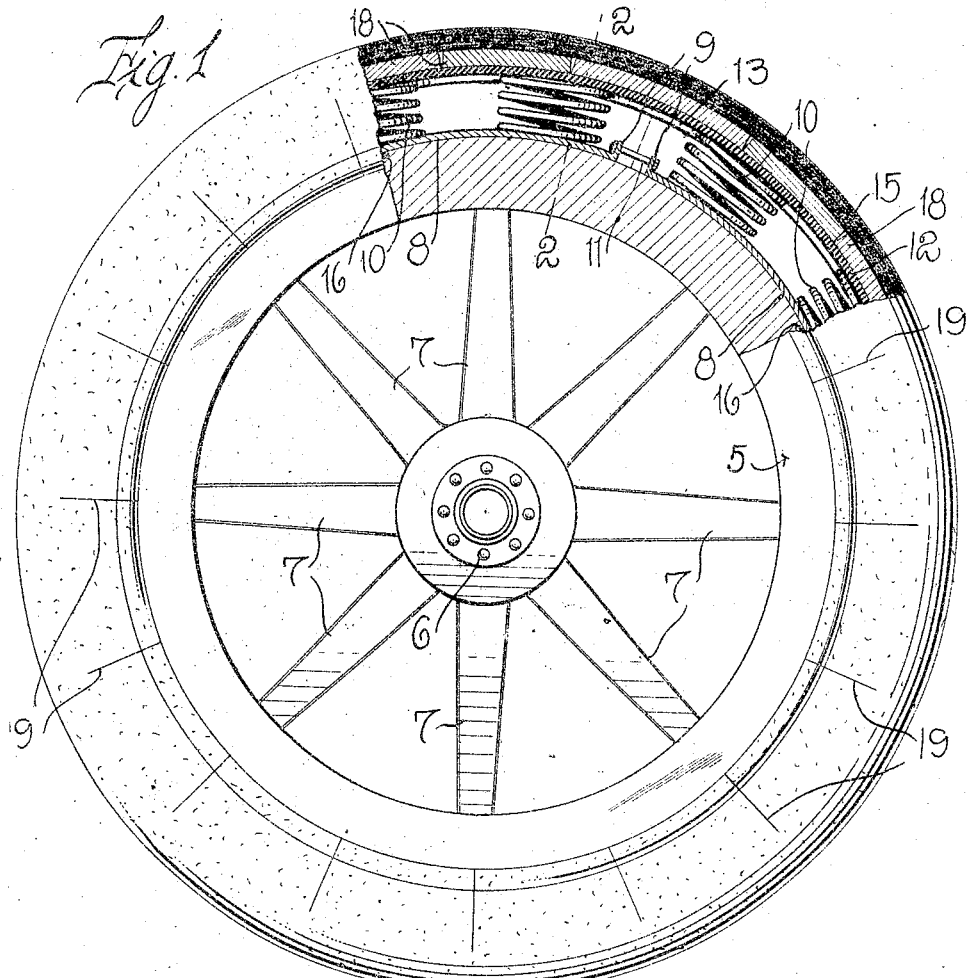
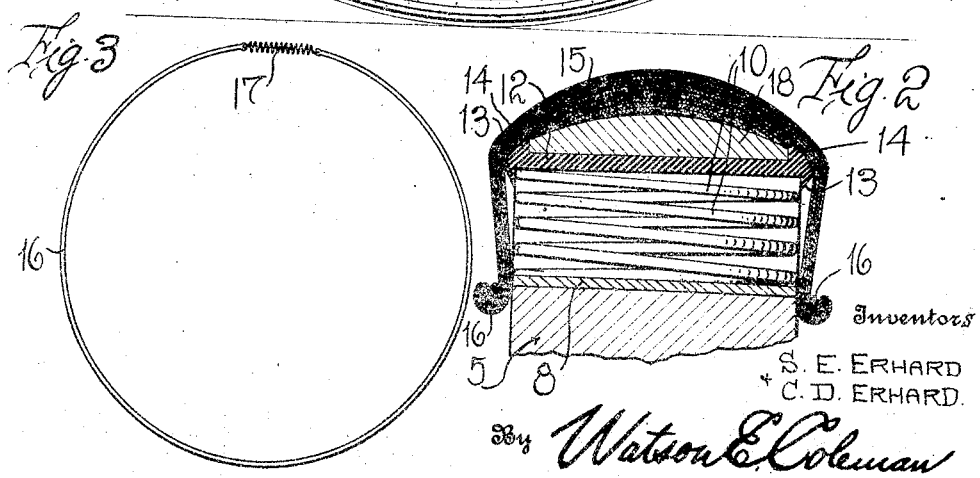

SAMUEL E. ERHARD AND CLARENCE D. ERHARD, OF TRINIDAD, COLORADO.

RESILIENT WHEEL-TIRE.

1,230,141.     Specification of Letters Patent.     Patented June 19, 1917.

Application filed February 24, 1917. Serial No. 150,791.

*To all whom it may concern:*

Be it known that we, SAMUEL E. ERHARD and CLARENCE D. ERHARD, citizens of the United States, residing at Trinidad, in the county of Las Animas and State of Colorado, have invented certain new and useful Improvements in Resilient Wheel-Tires, of which the following is a specification, reference being had to the accompanying drawings.

This invention relates to an improved resilient wheel tire and has for its primary object to provide a simply constructed tire of this character especially designed for use upon motor vehicles, which is exceedingly durable, can be easily and quickly applied to or removed from the felly of the wheel, and has a maximum of elasticity though the usual inflated pneumatic tire is dispensed with.

It is another and more particular object of our invention to provide a resilient tire for vehicle wheels including two series of coiled springs and means for connecting the two series of springs to each other and clamping the same upon the wheel felly, an annular rubber band encircling the series of springs and engaged therewith, an outer casing detachably secured at its edges to the wheel felly, and cushioning blocks interposed between said casing and rubber band.

It is a further general object of our invention to improve and simplify the construction of wheel tires of the above type and increase their efficiency and serviceability in practical use, and reduce the manufacturing cost thereof to a minimum.

With the above and other objects in view, our invention consists in the novel features of construction, combination and arrangement of parts to be hereinafter more fully described, claimed and illustrated in the accompanying drawing, in which, Figure 1 is a side elevation of a wheel provided with our improved tire, a portion of the outer casing being broken away;

Fig. 2 is an enlarged transverse section taken on the line 2—2 of Fig. 1;

Fig. 3 is a detail elevation of the yieldable clamping band or ring, whereby the casing is secured to the wheel felly.

Referring in detail to the drawing, 5 designates the felly of the wheel, 6 the hub, and 7 the radial spokes connecting the hub and felly.

In the preferred embodiment of our invention, we provide two substantially semicircular, resilient, steel bands 8, each of which is provided upon its ends with angularly disposed, apertured lugs 9. Upon the outer face of each of the bands 8, a series of coil springs 10 are arranged, the inner ends of said springs being suitably secured to the bands. These springs are preferably of a diameter substantially equivalent to the width of the bands 8 and are capable of relative compression and expansion. The series of springs on the bands 8 are tightly clamped upon the periphery of the wheel felly by means of the bolts 11 which are engaged through the apertured lugs or ears 9, and have suitable clamping nuts threaded upon one of their ends.

The series of coiled springs 10 are held against relative transverse tilting movement by means of a continuous rubber band 12 which encircles said springs and is provided upon its opposite edges with inwardly projecting flanges 13 extending over the sides of the springs. This band is also formed upon each of its longitudinal edges with an outwardly projecting, annular rib or flange 14.

15 designates the tire casing which may be made up of fabric, leather, or laminations of fabric and rubber, as desired, said casing having a relatively thick, central tread portion and thin side walls to extend inwardly over the opposite sides of the springs 10. In the drawing, we have shown the inner edges of these side walls provided with an expansible wire ring or band 16, in which a coil spring 17 may be interposed. These wire rings constitute reinforcing beads in the edges of the tire casing and are adapted for clamping engagement with the opposite sides of the wheel felly. Normally, the diameter of the inner edge of each side wall of the casing is somewhat less than the diameter of the wheel felly so that the wire rings or beads in the edges of the casing must first be expanded in order to seat the edges of the casing upon the felly. The beads or rings will then contract when released and tightly clamp the edges of the casing on the felly.

Between the intermediate tread portion of the tire casing 15 and the band 12, cushioning blocks 18, preferably of wood, are disposed. The opposed ends of the blocks 18 are beveled and diverge outwardly from each other. The opposite side walls of the tire casing 15 are preferably split at intervals, as indicated at 19 in Fig. 1, so as to facilitate the application of said casing and the attachment of the same to the felly of the wheel.

From the foregoing description, taken in connection with the accompanying drawing, the construction, manner of use and several advantages of the invention will be clearly and fully understood. As the load is successively borne by the springs 10, said springs will be compressed, thereby cushioning the shock or jar, and as soon as the compression is released, said springs will expand and return the tire casing to its normal condition. Thus, all shocks or jars will be absorbed by the wheel tire and not transmitted to the body of the vehicle. The elimination of the usual inflatable inner tube obviates the delays, inconvenience and expense incident to the punctures of such tube. The interposed wooden blocks 18 between the casing and the felly prevent pinching or cutting of the wall of the casing by the steel springs, while said blocks and the annular rubber band 12 also add materially to the resiliency of the tire. The flanges 13 and 14 on the edges of the band, space the side walls of the casing from the springs 10 and thus prevent wear upon the casing walls in their relative movement with respect to the springs. It will thus be seen that we have produced a wheel tire which will be very durable in practical use and requires but few repairs. At the same time, a maximum of resiliency is obtained in the tire structure and it may also be manufactured at relatively small cost.

While we have shown and described the preferred construction and arrangement of the several features employed, it is to be understood that the invention is susceptible of considerable modification therein and we, therefore, reserve the privilege of adopting all such legitimate changes as may be fairly embodied within the spirit and scope of the invention as claimed.

Having thus fully described our invention, what we desire to claim and secure by Letters Patent is:

The combination with a wheel having a felly, of two series of cushioning springs, means for detachably clamping the two series of springs upon the periphery of the wheel felly, a casing, means for detachably securing the casing to the edges of the wheel felly, an annular, resilient band extending around said springs and having inwardly projecting flanges on its edges holding the series of springs against relative transverse movement, the side walls of the casing being held in spaced relation to the springs by said flanges, said resilient band being also provided with outwardly projecting, annular ribs on its opposite edges, and fiber blocks disposed between the casing and the ribs on said band.

In testimony whereof we hereunto affix our signatures in the presence of two witnesses.

SAMUEL E. ERHARD.
CLARENCE D. ERHARD.

Witnesses:
  H. E. DICKINSON,
  R. R. MURRAY.